United States Patent [19]

Schwab

[11] Patent Number: 5,013,047
[45] Date of Patent: May 7, 1991

[54] APPARATUS FOR DETERMINING THE IDENTITY AND POSITION OF GAME OBJECTS

[75] Inventor: Günther Schwab, Munich, Fed. Rep. of Germany

[73] Assignee: Dr. Schwab Gesellschaft für Technologieberatung mbH, Munich, Fed. Rep. of Germany

[21] Appl. No.: 274,931
[22] PCT Filed: Mar. 12, 1987
[86] PCT No.: PCT/DE87/00111
  § 371 Date: Sep. 12, 1988
  § 102(e) Date: Sep. 12, 1988
[87] PCT Pub. No.: WO87/05723
  PCT Pub. Date: Sep. 24, 1987

[30] Foreign Application Priority Data

Mar. 12, 1986 [DE] Fed. Rep. of Germany ....... 3608148

[51] Int. Cl.⁵ .......................... A63F 3/02; G06F 3/03; G06F 15/44
[52] U.S. Cl. .................................. 273/238; 273/239; 434/128
[58] Field of Search ................ 273/238, 237; 434/128, 434/339, 340; 340/543, 825.31, 825.34, 825.77; 235/487, 492

[56] References Cited

U.S. PATENT DOCUMENTS

| | | | |
|---|---|---|---|
| 1,043,318 | 12/1912 | Jackson | 273/238 |
| 3,481,604 | 12/1969 | Fan | 273/238 |
| 3,843,132 | 10/1974 | Ferguson . | |
| 4,235,442 | 11/1980 | Nelson . | |
| 4,300,770 | 11/1981 | Kretzger | 273/238 |
| 4,323,243 | 4/1982 | Hanson | 273/238 |
| 4,339,798 | 7/1982 | Hedges et al. . | |
| 4,343,609 | 8/1982 | Cardinal | 434/128 |
| 4,391,447 | 7/1983 | Dudley | 273/238 |
| 4,541,633 | 9/1985 | Newbill | 273/238 |
| 4,796,891 | 1/1989 | Milner | 273/238 |

FOREIGN PATENT DOCUMENTS

| | | | |
|---|---|---|---|
| 0023271 | 2/1981 | European Pat. Off. . | |
| 2932167 | 2/1981 | Fed. Rep. of Germany . | |
| 3309817 | 9/1984 | Fed. Rep. of Germany | 273/238 |
| 2449388 | 9/1980 | France . | |
| 0731981 | 5/1980 | U.S.S.R. | 434/128 |
| 0807378 | 2/1981 | U.S.S.R. | 434/128 |
| 393190 | 6/1933 | United Kingdom . | |
| 1488654 | 10/1977 | United Kingdom . | |
| 2051589 | 1/1981 | United Kingdom . | |
| 2078533 | 1/1982 | United Kingdom . | |
| 2103943 | 3/1983 | United Kingdom . | |
| 2161629 | 1/1986 | United Kingdom . | |

OTHER PUBLICATIONS

EDN Magazine, vol. 26, No. 4, Feb. 1981, (Boston, Mass., U.S.A.), E. D. Cooper: "Electronic Chess Piece Tells its Place".

Primary Examiner—Edward M. Coven
Assistant Examiner—Jessica J. Harrison
Attorney, Agent, or Firm—Spencer & Frank

[57] ABSTRACT

An apparatus for determining the identity and position of game pieces disposed at any desired location within various fields of a playing area, such as a chessboard. The fields are subdivided into at least two subfields and an electrical signal is applied to one of the subfields. The signal is conducted to a second subfield by means of identification devices disposed at the underside of the game pieces where the signal is detected by a scanning device and evaluated in an evaluation device. The evaluation device stores signals associated with the individual game pieces as a function of the identification devices so that a signal comparison determines the identity, as well as the position, of each respective game pieces disposed in the playing area. Additionally, an arrangement is disclosed for the automatic monitoring, display, commentary and documentation of chess games, with the arrangement including a plurality of electronic chessboards connected with video interfaces and being able to detect the position and type of the individual chess pieces on the chessboard and to convert the detected pieces into electrical signals for evaluation of the individual players in the form of protocols, determination of the winner and display of the individual games.

24 Claims, 8 Drawing Sheets

APPARATUS FOR DETERMINING THE IDENTITY AND POSITION OF GAME OBJECTS

BACKGROUND OF THE INVENTION

The invention relates to an apparatus for determining the identity and position of objects which are disposed in different fields of an area divided into a predetermined number of equal size fields, particularly for a determination of the identify and position of chess pieces on a chessboard.

DE-2,932,167 and GB-A-2,051,589 disclose, in connection with chess computers, the arrangement of the position of the chess pieces on the individual squares of a chessboard with the aid of permanent magnets attached to the underside of the chess pieces and with reed relays which are disposed on the underside of the chessboard and respond to the magnetic fields of the permanent magnets or similar contact switches which react to magnetic fields. If a chess piece is disposed on one of the squares of the chessboard, the magnetic field emanating from the permanent magnet of the chess piece causes the respective contact switch and thus, a circuit to be closed so that, in conjunction with a corresponding monitoring device, it can be determined on which squares of the chessboard chess pieces are disposed. In conjunction with a microprocessor and memory, the movement of the individual chess pieces can thus be reproduced and countermoves can be calculated by means of the processor and can be displayed, for example, by means of light-emitting diodes disposed in the individual squares of the chessboard or by means of liquid-crystal displays which indicate the row and column of the respective square of the chessboard.

However, the prior art devices are unable to indicate, in addition to the position of individual chess pieces, i.e. indicating whether a playing square is occupied or not, the identity of the chess piece that occupies the respective chess square. Thus it is necessary, for example, in solving chess problems by means of a chess computer, for the player to put the pieces onto the corresponding squares and simultaneously input by way of a keyboard which piece occupies the respective square. Only in the starting position of the chess pieces is it not necessary to provide additional input because this position input is stored in the program.

GB-A-2,103,943 relates to an electronic board game, particularly an electronic chessboard in which each playing piece of the electronic board game is provided with an identification device in the form of an electrical resonance circuit set to a certain resonant frequency so that it differs from the resonant frequency of the other playing pieces. Each square of the electronic chessboard is equipped with a scanning device in the form of a transmitter which emits a pulse to produce a resonant oscillation in the resonant circuit of a game piece located in the respective square. The resonant frequency picked up by a receiver is evaluated with the aid of a discriminator to determine the identity and position of the respective chess piece o the square in that the number of oscillations of the received signal are counted and the number of oscillations is compared with a stored value which is associated with the respective playing piece. Thereafter the evaluation device puts out a signal corresponding to the identity and position of the playing pieces on the square.

The above prior art device is based on a contactless identity and position determination and assumes accurate matching between the transmitter signal, the resonant circuit and the received signal. The required precise matching involves, considerable expenditures in the production and testing of the electronic game board and, makes it highly sensitive to extraneous interfering influences.

DE-A-3,309,817 also discloses a game employing a playing field composed of a plurality of individual fields and involving a plurality of playing elements in which the playing elements are provided with different codes which are detected by sensors in the fields. The outputs of the sensors are connected with a signal processing device through which the course of the game is stored and evaluated. In the prior art game, the coding of the playing elements is composed of rod-shaped permanent magnets of given lengths while the sensors in the individual playing fields are Hall sensors which are connected over a common current path with a constant current source. As a consequence of the different lengths of the individual rod magnets and possibly different polarities the Hall sensors are able to detect the position as well as the identity of the respective playing element.

In this prior art device it is necessary to accurately position the individual playing elements so that the Hall sensors are influenced in a suitable manner by the rod magnets of the playing elements. For this purpose, a recess is provided into which the respective playing elements must be inserted to unequivocally position them.

In addition, magnetic shields are required so that adjacent playing elements are not influenced. Here again it is necessary to very accurately align the Hall sensors and the rod magnets and, as a result of the limited length of the individual playing elements, only a limited number of different playing elements can be identified by rod magnets of different lengths.

SUMMARY OF THE INVENTION

It is the object of the present invention to provide a method and an apparatus for determining the identity and position of objects of the above-mentioned type with which it is possible, with low expenditures for circuitry and alignment, to reliably indicate the identity and position of the object with low sensitivity to extraneous interfering influences.

This is accomplished in that the fields are subdivided into at least two subfields and a first part and a second part of the subfields of a field are bridged by identification devices each provided with an impedance arrangement. The impedance is measured between the first and the second part of the subfields in that an electrical input signal is applied to the first part of the subfields and the evaluation device detects the electrical output signal at the second part of the subfields.

The solution according to the invention permits reliable detection of the identity as well as the position of an object on a plurality of fields in an area, with low expenditures for circuitry and alignment and low sensitivity to extraneous interfering influences.

An apparatus for determining the identity and position of objects is characterized in that each on of the fields of the area is subdivided into at least two subfields, that, with the objects in any position in a field, the face of the objects contacting the field of the area bridges two subfields at least in part; each one of the objects is provided with a predetermined resistance arrangement which is connected with at least two contact points arranged on the face contacting the respective field in such a manner that they contact at least one subfield; the one subfield is connected with a signal generator which emits a predetermined electrical signal and the other subfield is connected with a signal receiver which, if a field is occupied by an object, detects a changed signal as a result of the predetermined resistance arrangement of the respective object and transmits it to the evaluation device which indicates the occupation of the respective field of the area and, by comparison of the changed signal with stored values of changed signals for the individual objects, puts out a signal which indicates the identity and position of the respective object.

This apparatus can be produced with low expenditures for components and circuitry and with low expenditures for the alignment of the identification and evaluation devices and, due to the simple impedance measurement, is distinguished by the highest degree of reliability in the detection of the identity and position of the objects.

An arrangement for monitoring, displaying, commenting on and documenting chess games which utilizes the device for detecting the identity and position of objects on a plurality of fields in an area is characterized in that at least one electronic chessboard which detects the position of the chess pieces is connected with a video interface whose output is connected with a video display device as well as with a sample-and-hold circuit; the sample-and-hold circuit is connected with the input of a data processing device; the video interface is connected with an input keyboard for inputting identifications or game data which are displayed on the video display device and/or output to the data processing device; and the video interface is connected with a chess clock operable by the chess players.

This solution makes it possible, in the use of electronic chessboards, to automatically monitor the legality of individual moves so that the work of the referee is facilitated and centralized. With the apparatus according to the invention, it is possible to evaluate even larger tournaments involving a large number of participating chess players in a minimum of time. Additionally, a record of the individual chess games is automatically made and stored and comments on the individual chess games can be made in a clear form on monitors or large-format screens; it is possible to transmit by television transmissions the games to any desired location. Additionally, tournaments can be automatically documented and collected, for example, by the World Chess Federation.

BRIEF DESCRIPTION OF THE DRAWINGS

Advantageous modifications of the invention are defined in the dependent claims and will now be described in greater detail in connection with a description of the preferred embodiment of the invention and with reference to the drawing figures. It is shown in:

DETAILED DESCRIPTION OF THE PREFERRED EMBODIMENTS

Figure 1:
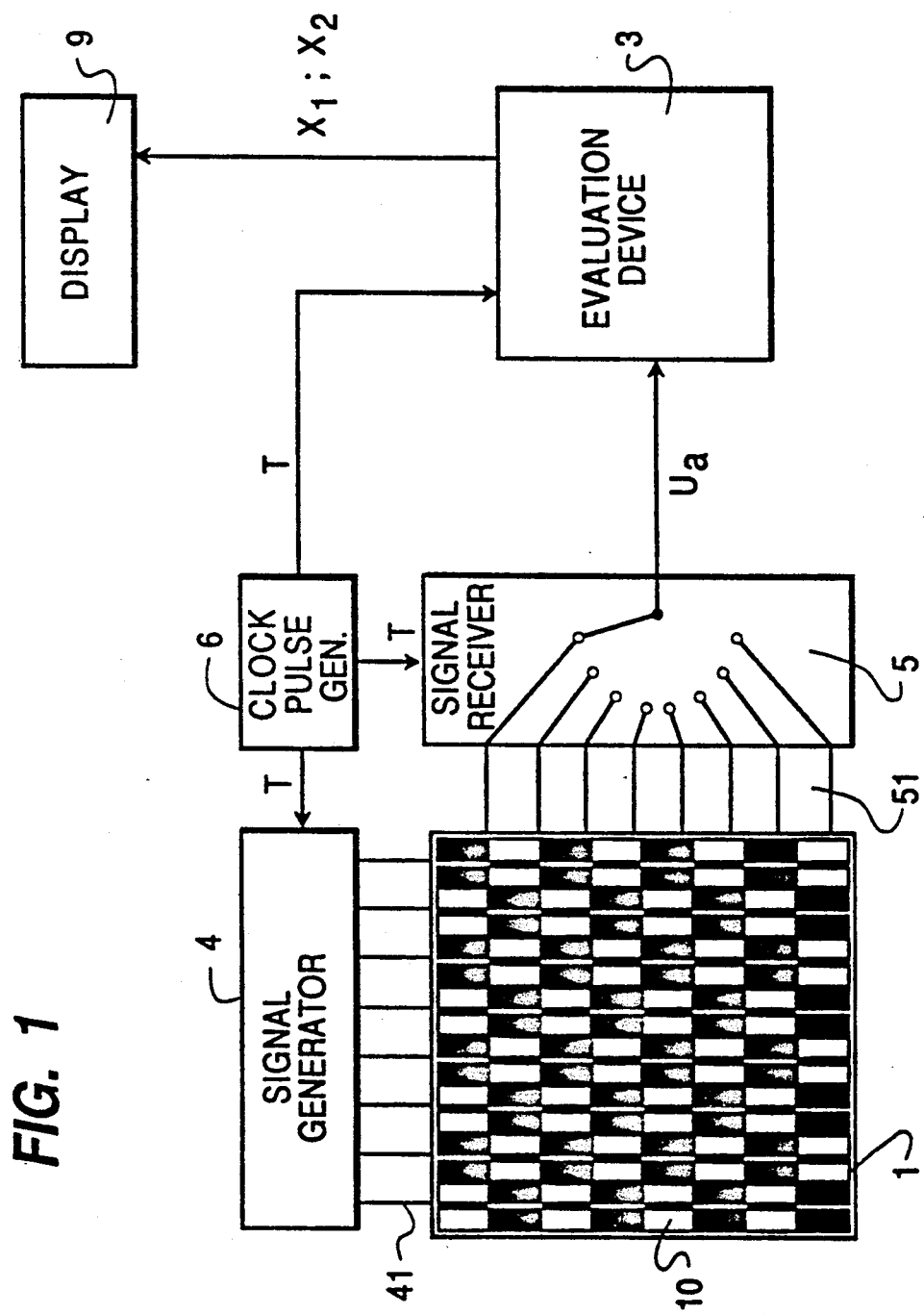
FIG. 1, a block circuit diagram for a determination of the identity and position of chess pieces on a chessboard.

The block circuit diagram shown in FIG. 1 depicts a chessboard 1 having 64 individual squares 10 which are each arranged in a known manner in eight rows and eight columns. The individual columns of chessboard 1 are connected by way of lines 41 with the outputs of a signal generator 4, while the eight rows of chessboard 1 are connected via lines 51 with a signal receiver 5. Signal receiver 5 is connected with the input of an evaluation device 3 whose output, in turn, is connected with a display device 9, for example a light-emitting diode display, a liquid-crystal display or any desired screen display. A clock pulse generator 6 synchronizes, by way of clock pulse lines T, the operation of signal generator 4 as well as that of signal receiver 5 and evaluation device 3.

As can be seen in the schematic illustration of FIG. 1, the individual squares 10 of chessboard 1 are subdivided into two essentially equal size halves and are separated electrically by a standard insulating layer. By means of signal generator 4, a signal is applied via output lines 41 to the respective one half of the individual squares 10, while the other halves of squares 10 are each connected via a line 51 with signal receiver 5.

By establishing a conductive connection from the one half of each square 10 to the other half by means of an identification device disposed at the underside of the chess pieces, the signals fed by signal generator 4 to the respective one half of squares 10 are transmitted to the other half of the individual squares 10 so that signal receiver 5 is able to detect, by way of lines 51, the occupation of a certain square of the 64 squares of chessboard 1 and, as a result of the identification device, the identity of each one of the respective chess pieces, i.e. whether it is a white king or a black king, a white queen or a black queen, a white rook or a black rook, bishop, knight or pawn and transmit the respective signal $U_a$ to evaluation device 3.

The electrical signals put out by signal generator 4 may be direct voltage signals as well as alternating voltage signals of any desired frequency. If a square is occupied by a chess piece, a direct or alternating current of varying magnitude is conducted by means of an impedance arrangement at the underside of the chess pieces, in dependence on the magnitude of the impedance from the one half of each square which is connected with one output of signal generator 4 to the other half of the respective square so that detection of the respective current flow through signal receiver 5 enables evaluation device 3 to determine the type of the respective chess piece.

Evaluation device 3 compares the currents emitted for each one of the occupied squares with corresponding current values stored for the individual, possible chess pieces. Since the identification of chess pieces, in principle, involves 12 different pieces, the values for these 12 different possibilities must be provided in evaluation device 3 so that a comparison of the stored values with the signals put out by signal receiver 5 makes it possible to determine the identity of the respective chess piece. Since, moreover, interrogation of the individual squares is synchronized by means of clock pulse generator 6, it can simultaneously be determined whether the square presently being interrogated is occupied or not since for an unoccupied square no connection whatsoever is established between the two halves of the individual squares 10, thus no current can be detected by signal receiver 5.

Scanning of the individual squares 10 of chessboard 1 may be effected in various ways. The simplest way is to connect the one half of each square with signal receiver 5. This would result in each case in 64 lines 41 and 64 lines 51 which involves a considerable amount of expenditures for circuitry.

A simpler way is to connect the one half of all squares of one column with one of, thus, eight outputs of signal generator 4 so that signal generator 4 would apply, via eight output lines, a signal to the respective one half of the eight squares of one column of chessboard 1. By cyclic switching, signal receiver 5 can then interrogate the respective other halves of the individual squares 10 and, if a square is occupied, signal receiver 5 can transmit a signal depending on the chess piece disposed on the square to evaluation device 3.

A minimum of line connections for the individual squares 10 of chessboard 1 with signal generator 4, on the one hand, and with signal receiver 5 on he other hand, is realized in that, analogously to the above-described arrangement, the first halves of all squares 10 of a column are connected with one another and with one output of signal generator 4, while the respective second halves of all squares 10 of one row are connected together and with signal receiver 5 so that eight row output lines 51 lead to signal receiver 5. This arrangement presupposes that signal generator 4 emits a signal each time to only one column of chessboard I and this signal is cyclically transferred to the other columns and that signal receiver 5 also cyclically interrogates the individual rows of the chessboard matrix. Since clock pulse generator 6 synchronizes signal generator 4, signal receiver 5 and evaluation device 3 with one another, cyclic switching of signal generator 4 and of signal receiver 5 makes it possible to interrogate each individual square 10 of the chessboard. The current values obtained if a square of chessboard 1 is occupied by a chess piece are compared in the evaluation device with stored values and a corresponding signal $X_1$, $X_2$, which indicates the position of the respective chess piece within the chessboard matrix as well as the type of the respective chess piece outputted. The determination of the identity of an object on a given field of an area will be described in greater detail with reference to FIGS. 2 to 4.

Figure 2:
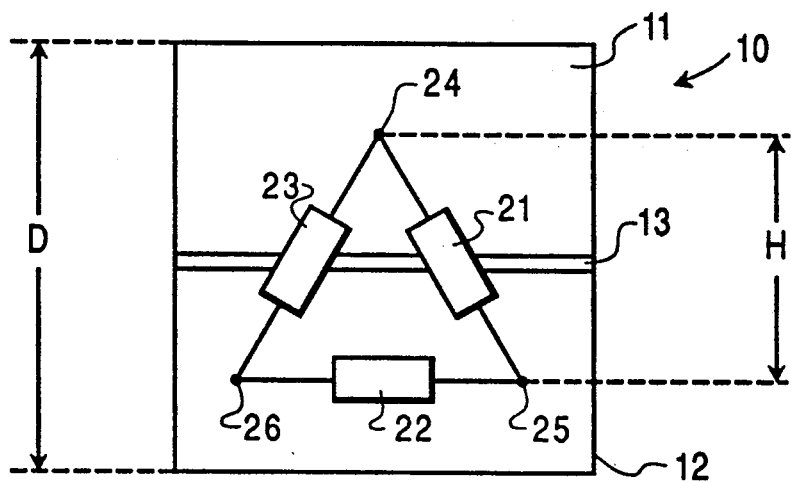
FIGS. 2 and 3, schematic representations of various positions of the resistance arrangement attached to an object on a field divided into two subfields.

As can be seen in the illustration of FIG. 2, each square 10 is divided into two approximately equal sized subfields 11 and 12 which are separated from one another by an insulating layer 13. The two subfields 11 and 12 are electrically connected as described above with the signal generator and the signal receiver, respectively. An object to be identified is provided on its underside, i.e. on its face contacting the square, with three contact points 24, 25 and 26 which are each connected with two resistors 21, 22, or 22, 23 or 21, 23, respectively, so that a triangular resistance arrangement results. Contact points 24, 25 and 26 may be composed, for example, of an electrically conductive rubber or plastic so that an electrical connection of contact points 24, 25 and 26 with subfields 11 and 12 is established.

Figure 3:
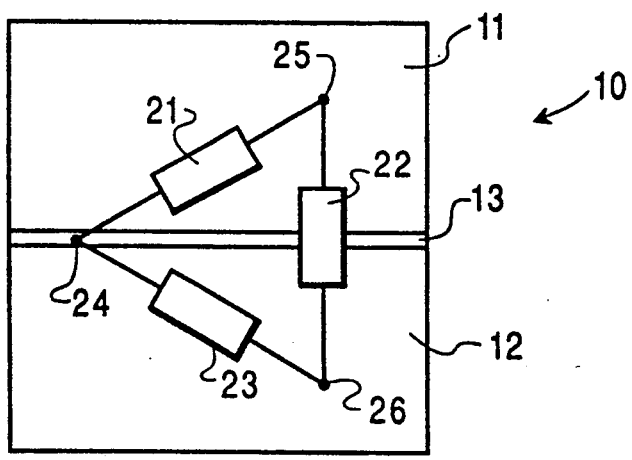

Contact points 24, 25 and 26 are preferably points of an equilateral triangle whose height H is dimensioned in such a manner that it is slightly larger than one-half the length of a side D of the square field 10. In this way it is ensured that the object, for example a chess piece, can be freely positioned on a chess square, i.e. need not be placed into the center of the square to establish an electrical connection between the two subfields 11 and 12 by way of resistance arrangement 21, 22, 23. Because of the triangular arrangement, it is additionally ensured that at least two points are disposed in different subfields 11 or 12 in any position of the object in square 10. FIG. 3 shows a position in which the object is arranged on square 10 so that one of the contact points, here contact point 24, is disposed directly on insulating layer 13.

FIG. 3 also illustrates a further condition for the reliable detection of the identity of the respective object in square 10 which is that the diameters of the contact points must be smaller than the thickness of insulating layer 13 since otherwise, if an object were positioned on square 10 as shown in FIG. 3, a short-circuit would be produced between the two subfields 11 and 12, which would make it impossible to measure the resistance in the resistance arrangement. An alternative t this condition is illustrated in the arrangement according to FIG. 5.

The illustrations of FIGS. 2 and 3 show clearly that, with a triangular connection of resistors 21, 22 and 23, a measurement is made, depending on the position of the object in square 10, from the parallel connection of two equal size, impedances 22 and 23 (FIG. 2) or from the parallel connection of one impedance 22 with the series connection of two equal size impedances 21 and 23 (FIG. 3). If the impedance is Z and it is assumed that all impedances 21, 22 and 23 have the same impedance value Z, if a square 10 is occupied by an object, either the total impedance Z/2 or ⅔ Z is included in the measurement. Thus, depending on the number of different objects that can be positioned in squares 10, impedance values result which correspond to twice the number of different objects. In the determination of the impedance values for the individual objects care must be taken that, under consideration of signal fluctuations, the differences are great enough to maintain a sufficient safety distance from the respective adjacent impedance value even if there is insufficient contact from contact points 24, 25 and 26. On the other hand, too large a range of measured values and too much dynamic in the measuring process poses problems with respect to the use, for example, of multiplexers as the measured value receivers. Due to the fact that an impedance value of $Z/2$ or $\frac{2}{3}Z$ is detected in dependence on the position of the object in square 10, the impedance values are associated with the individual objects in such a way that, in order to realize a small range of measured values, the possible measured impedance values are distributed according to the following scheme:

$$Z_{0/2}, Z_{17/8}, \vdots_0, \vdots Z_1, Z_{2/2}, \ldots, Z_{n-\frac{1}{2}}, Z_{n-2}, \vdots Z_{n-1}, \vdots Z_n.$$

Any desired combination of an active resistance, a capacitance or an inductance in conjunction with an alternating voltage signal emitted by the signal generator is applicable as the impedance. Preferably, however, the signal generator emits a direct voltage and active resistances are employed as identification devices for the individual objects. This will now be described in greater detail in connection with the determination of the identity and position of chess pieces on a chessboard.

Each one of the six different chess pieces (king, queen, rook, knight, bishop, pawn) of each playing color (white, black) is associated with a certain active resistance value $R_0, R_1, \ldots R_{12}$ so that the total resistance for each individual piece has the following value:

$$R_{0/2}; R_{\frac{1}{2}}; \vdots R_0; \vdots R_{2/2}; \ldots; R_{11/2}; R_{12/2}; \vdots R_{11}.$$

The resistances for the individual chess pieces are now determined in such a way that identical distances result between the total resistance values so that a maximum safety distance results for a minimum difference between the highest and lowest resistance values, thus minimizing the range of measured values.

Figure 4:
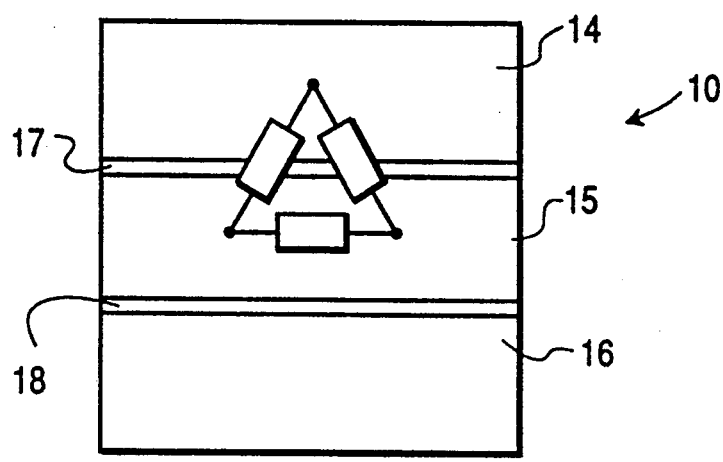
FIG. 4, a schematic representation of the resistance arrangement of an object on a field divided into three subfields.
Figure 5:
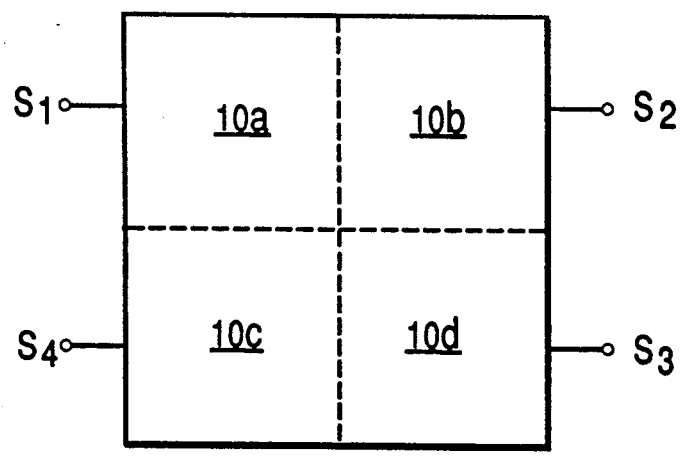
FIG. 5 a schematic representation of a field divided into four subfields for changing excitation.

FIGS. 4 and 5 illustrate further embodiments for the configuration of squares 10 in conjunction with a triangular resistance arrangement.

FIG. 4 shows a square subdivided into three equal size subfields 14, 15 and 16, with subfields 14, 15 and 16 being separated from one another by insulating layers 17 and 18. Since in this case, the condition $$H > \frac{D}{3}$$

must be met, the contact area of the object to be positioned in square 10 may be made smaller than in the preceding embodiment according to FIGS. 2 and 3 without there existing the danger that no measurement is possible since, because of the arrangement of the object, all three contact points 24, 25 and 26 are disposed in the same square. In the embodiment of FIG. 4, the signal generator may apply a signal, for example, to subfield 15, while subfields 14 and 16 are connected with one another and with the signal receiver. As an alternative, the signal generator may alternatingly apply a signal to subfields 14 and 16, while subfield 15 is connected with the signal receiver. In this way, error measurements as a result of possible short circuits can be avoided analogously to the arrangement of FIG. 5.

FIG. 5 shows an embodiment in which square 10 is composed of four equal size subfields 10a, 10b, 10c and 10d, which are separated from one another by corresponding insulating layers. The individual subfields 10a to 10d are connected with terminals S1 to S4 which are connected with the signal generator as well as with the signal receiver and are alternatively switched to the signal generator and the signal receiver. By switching, either the subfield area composed of subfields 10a and 10b or the subfield area composed of subfields 10a and 10c is connected with the signal generator and the respectively remaining subfield area is connected with the signal receiver so that, for the case where the contact points are larger than the insulating layer and thus the danger of a short-circuit exists, a measurement can take place even if the object has an unfavorable position on square 10 since, in any case, one of the two measurements will not have a short-circuit.

Figure 6:
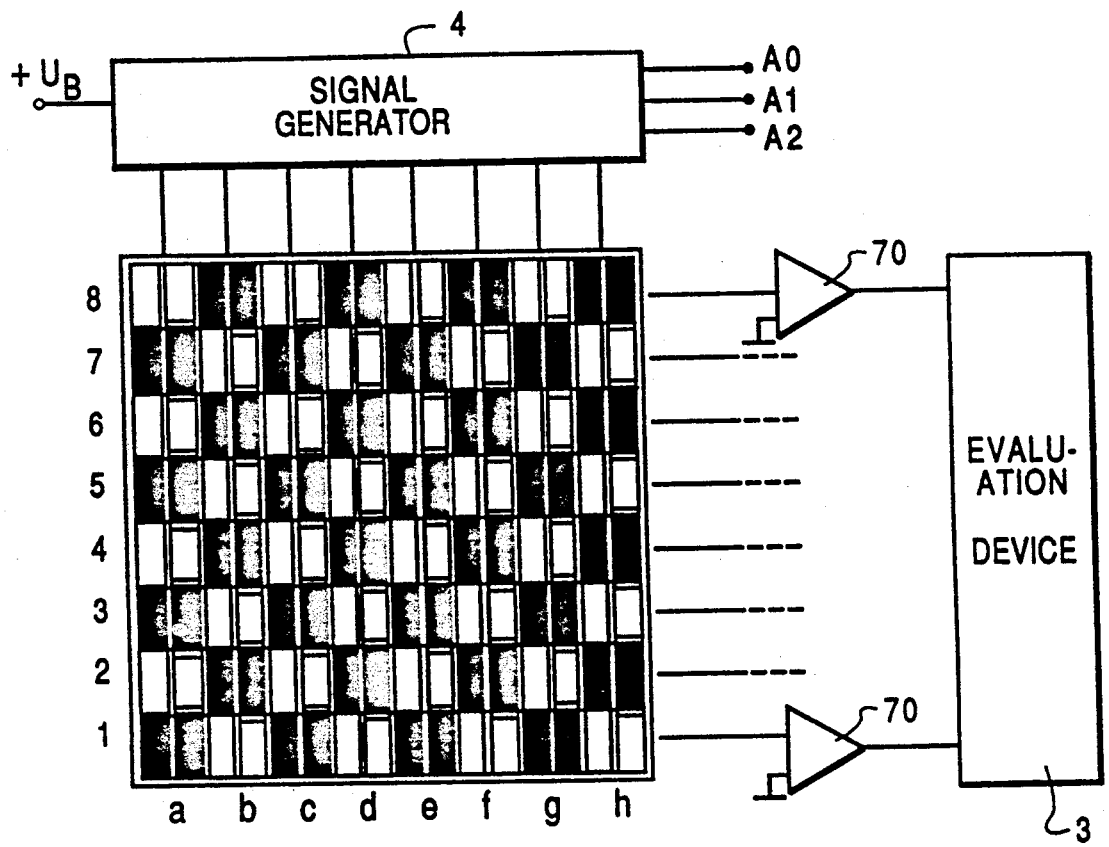
FIG. 6, a schematic representation of a chessboard divided into subfields and provided with a signal generator and a signal receiver.

The basic circuit diagram shown in FIG. 6 for the determination of the identity and position of chess pieces on a chessboard 1 clearly shows the division of the individual squares into subfields which are connected either with signal generator 4 or with the input of an operational amplifier 70. The matrix-shaped chessboard is divided, in a known manner, into eight rows and eight columns which, in conformance with an international agreement, are identified with numbers (1) to (8) for the rows and letters (a) to (h) for the columns. In the arrangement of FIG. 6, the subfields of columns (a) to (h) are connected with one another and each with one of eight outputs of signal generator 4.

The remaining subfields of each row (1) to (8) of the matrix-shaped chessboard are each connected via a line with an input of an amplifier 70 provided for each one of rows (1) to (8). The output of the respective amplifier is connected with one of eight inputs of evaluation device 3.

Signal generator 4 is additionally provided with three address inputs A0 to A2, each able to activate one of the eight lines connected with columns (a) to (h) of the chessboard matrix. If, for example, the signal generator is connected with a direct voltage $+U_B$, this voltage $+U_B$ can be applied, in dependence on the particular address, to one of the eight output lines. This can be accomplished, for example, in that the signal generator is composed of a combinatorial logic circuit in conjunction with field effect or bipolar transistors whose control terminals are connected with the outputs of the combinatorial logic circuit, while the load paths are connected, on the one hand, with voltage source $+U_B$ and, on the other hand, with the connecting lines leading to columns (a) to (h) of the chessboard matrix.

Figure 7:
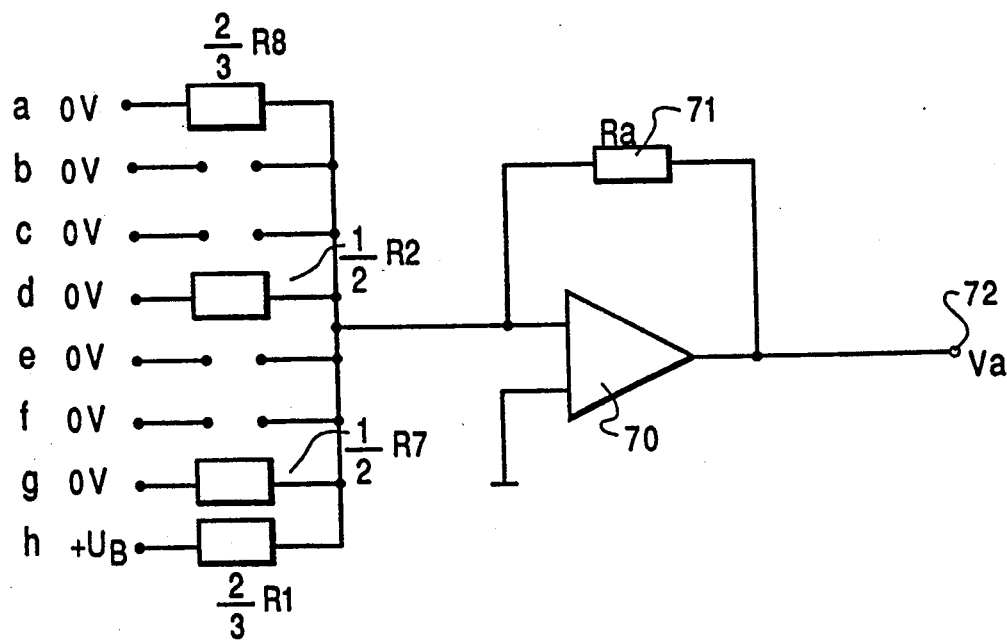
FIG. 7, a circuit for detecting changed signals as a result of chess pieces arranged on the squares of the chessboard according to FIG. 6.

As can be seen in the illustration of FIG. 7 in conjunction with FIG. 6, the one input of operational amplifier 70 is connected with the respective eight subfields of each row (1) to (8) on which different types of chess pieces are positioned or not. The illustration of FIG. 7 depicts a single row of the chessboard matrix and the fact that a square is occupied is indicated by showing a resistance. The illustration of FIG. 7 shows that, for example, the subfield in column (a) of the respective row is occupied by a chess piece which has an associated resistance value $R_8$. The subfields of columns (b), (c), (e) and (f) are unoccupied, while the remaining subfields (d), (g) and (h) are occupied by different chess pieces.

Since signal generator 4 applies a direct voltage $+U_B$ cyclically to the individual columns (a) to (h), the voltage $+U_B$ can be present at any one time at only one of the columns, in the illustration of FIG. 6 at column (h), so that the respective field of column (h) is present at the input of operational amplifier 70. In this case, current is able to flow only from the subfields of column (h) to the other subfields of this column, assuming the respective square is occupied by a chess piece. In the illustration of FIG. 7, in which operational amplifier 70 includes a resistor 71 which has the resistance value Ra, the voltage $U_a$ present at output 72 of operational amplifier 70 is thus:

$$U_a = \frac{U_B \cdot R_a}{R_1}$$

Analogously, the seven further operational amplifiers emit corresponding output voltages assuming the subfields of column (h) associated with the individual rows (1) to (8) of the chessboard matrix are occupied by chess pieces. Thus, evaluation device 3 receives eight different measured values and can determine, in dependence on whether an output voltage exists and how great this output voltage is, whether a chess piece is disposed on the respective square of column (h) and what type of piece it is.

During the next measuring process, signal generator 4 applies voltage $+U_B$ to the subfields of column (a), etc. so that all squares of the chessboard matrix can be interrogated cyclically.

An arrangement with simpler circuitry than the arrangement of FIG. 5 is shown in the block circuit diagram of FIG. 8, again with the example of a game of chess.

Chessboard 1 includes, in a known manner, eight columns and eight rows of equal size squares 10 which, corresponding to the above statements, are each subdivided into two equal size subfields. The subfields of each column are connected with one another and are each connected to one of eight outputs, of a signal generator in the form of an 8-bit latch 4. In addition to its eight outputs and a voltage connection to voltage $+U_B$, the 8-bit latch has three address inputs A0 to A2.

The remaining subfields of each square are connected with one another by rows and each with one input of a multiplexer 5'. Multiplexer 5' also has three address inputs A3 to A5 and its analog output signal $U_a$ is connected with an input of an operational amplifier 7. The output of the operational amplifier is connected with the input of an analog/digital converter 8 whose digital output or digital outputs are connected with the input of a processor 31. On its other side, processor 31 is connected with a memory 32, for example a RAM [random-access memory]. The three address inputs of each of 8-bit latch 4' and multiplexer 5' are connected with address outputs of processor 31. An output line of processor 31 leads selectively to a display device (not shown in detail) and to a device which further processes the identification and position signals.

Controlled by the address outputs of processor 31, the 8-bit latch cyclically switches voltage $+U_B$ from one column to the next so that the subfields of each column of the chessboard matrix are charged with voltage $+U_B$. Controlled by address outputs A3 to A5, multiplexer 5 which is connected with the eight rows of the chessboard matrix switches from one row to the next and thus conducts the measured value of each subfield of each row to the input of amplifier 7. Since in each row all voltages are zero except for the square whose column is charged with voltage $+U_B$, only the current through one (complex) resistor of a column is measured, with the impedance value being a function of the chess piece located on the respective square. The detected measured value is amplified by means of amplifier 7 and is converted in an analog/digital converter 8 into a digital signal D which is transferred either in parallel or serially to one or several inputs of processor 31.

By way of a comparison with digital signals Y stored in memory 32 for the individual chess pieces, a suitable program sequence determines with which chess piece the digital signal put out by analog/digital converter 8 should be associated. In view of the actuation of 8-bit latch 4 and multiplexer 5 via address lines A0 to A5, processor 31 is additionally able to determine which square from the 64 squares of the chessboard matrix is presently being interrogated and whether as well as with what piece corresponding to the picked up digital signal this respective square is occupied. Accordingly, signals $X_1$ and $X_2$ are emitted to indicate the position and identity of the respective chess piece.

Figure 8:
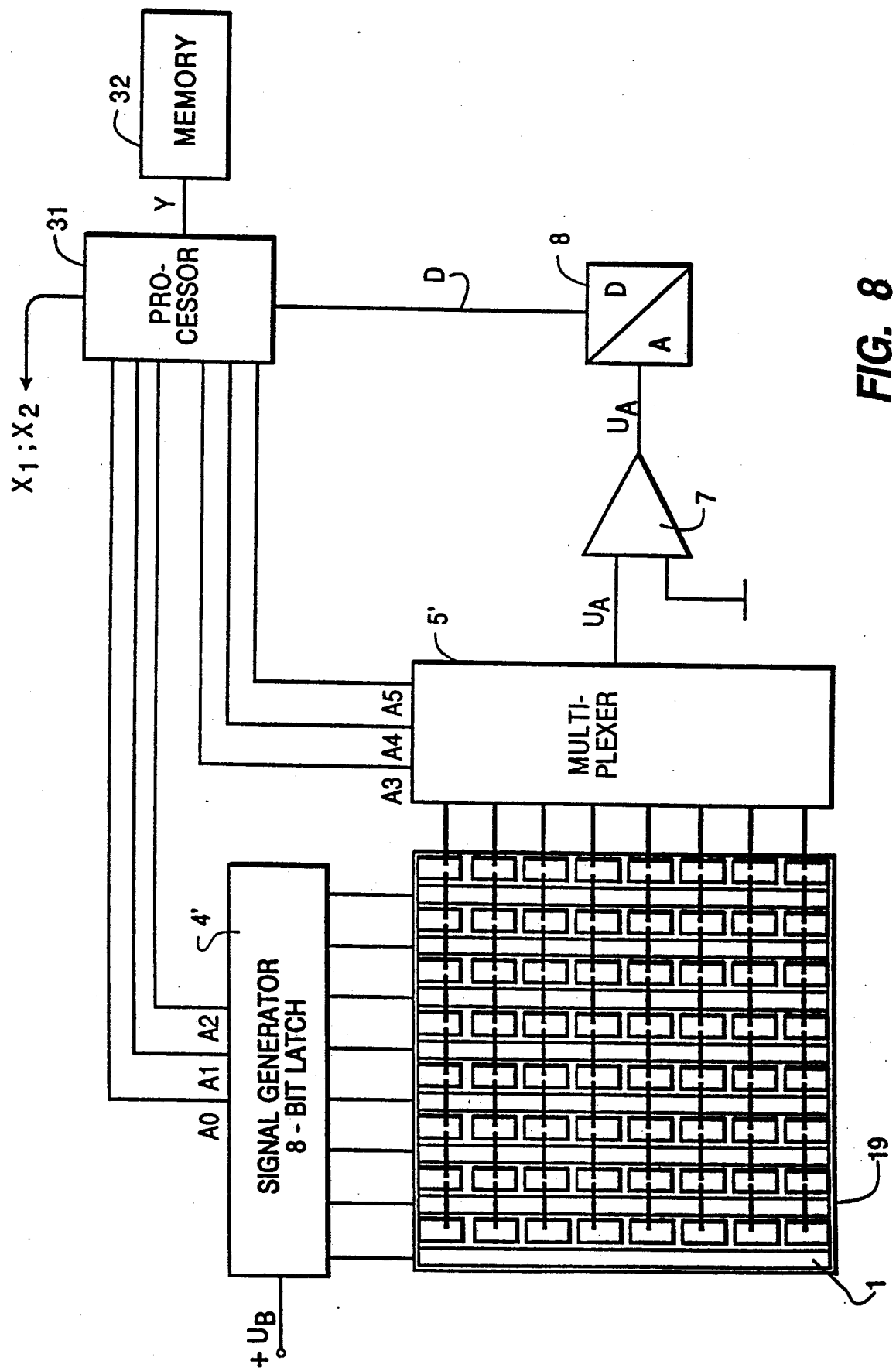
FIG. 8, a block circuit diagram of an apparatus for detecting the identity and position of chess pieces on a chessboard by scanning the individual squares of the chessboard by rows and columns.

As can be seen in the illustration of FIG. 8, the subfields connected with the outputs of 8-bit latch 4' are configured as conductor strips, while the other subfields connected with the inputs of multiplexer 5' are configured as insulated rectangles which, however, are connected with one another by rows and with the respective input of multiplexer 5'. Insulating strips 19 are provided between the individual squares for potential separation.

The circuit board configuration of the chessboard of FIG. 8 can be produced, for example, in that a conductive foil which contains the continuous subfields of the squares of one column, as well as the individual insulated rectangles as conductive foil elements, is glued onto a wooden plate so that insulated sections 19 are formed in this way.

An 8-bit latch HEF40373B can be mentioned as an example for the 8-bit latch while an 8-channel analog multiplexer/demultiplexer HEF4051B can be employed as the multiplexer.

Instead of an analog/digital converter, a voltage/frequency converter, for example, can also be employed which emits a certain frequency in response to a certain input voltage. Such frequencies serve, for example by way of filter members, to determine the respective object on the measured field. However, any other configuration is also possible in which a certain measured value is associated with a certain object.

Although the active resistance measurement has been shown as a special embodiment, impedances can also be measured in an entirely analogous manner if an alternating voltage is applied, without leaving the scope of the disclosure.

Figure 9:
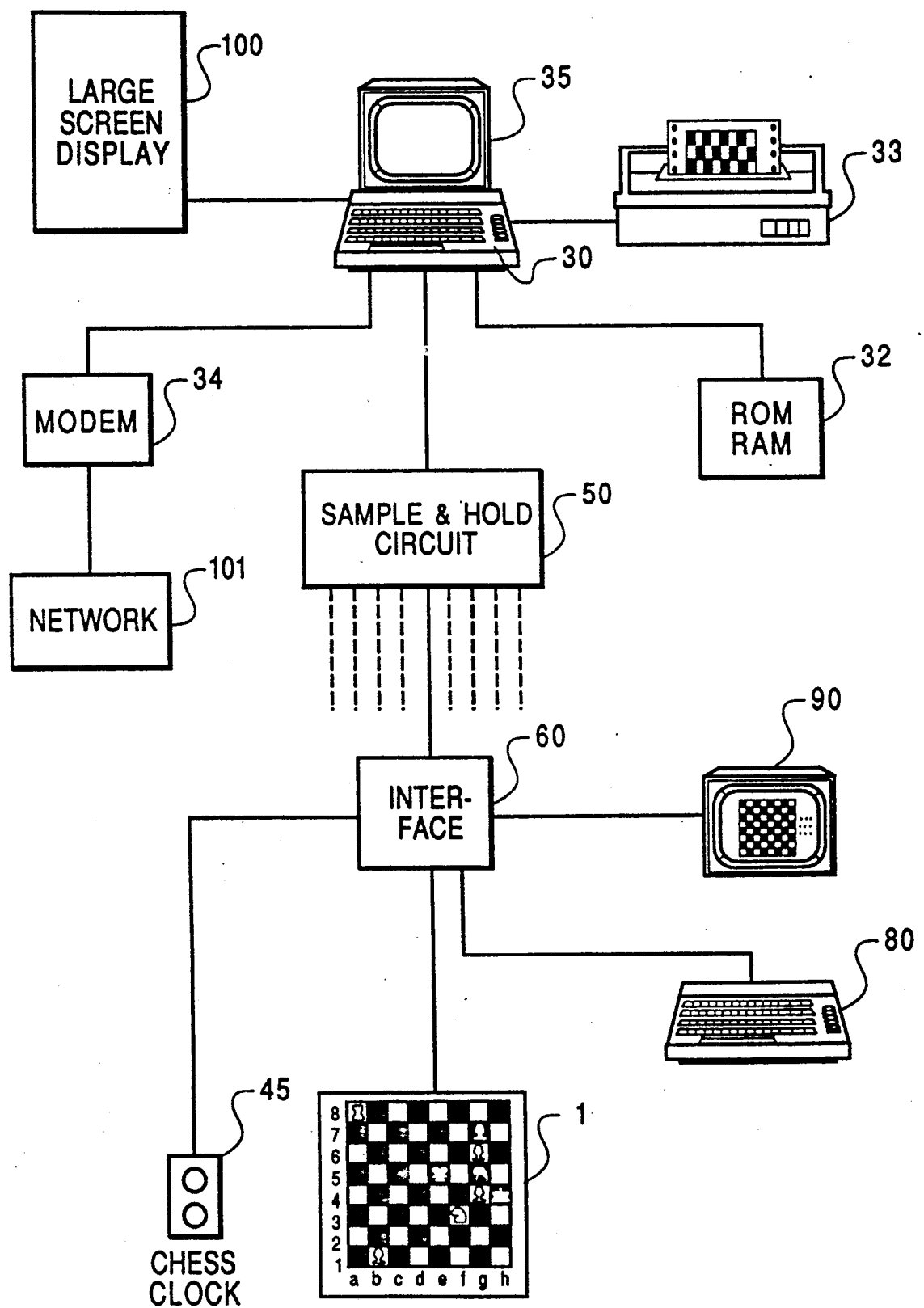
FIG. 9, a block circuit diagram of an arrangement for monitoring, displaying, commenting on and documenting chess games.

The block circuit diagram shown in FIG. 9 for the basic structure of an arrangement for monitoring, displaying, commenting on and documenting chess games includes an electronic chessboard 1 whose output is connected with a video interface 60 whose other inputs are connected with a chess clock 45 and an input keyboard 80 and whose outputs are connected with a video display device 90 and with an input of a sample-and-hold circuit 50.

Sample-and-hold circuit 50 is connected with a plurality of identical video interfaces equipped with a connected electronic chessboard, input keyboard, chess clock and video display device, with the number of connected video interfaces being variable as desired. The output of sample-and-hold circuit 50 is connected with the input of a data processing device 30 which may be, for example, a personal computer or a larger multipurpose data processing system.

The output of data processing device 30 is connected with a monitor 35, a large-screen display 100 and a printer 33 which preferably is a laser jet printer. Additionally, the other side of data processing device 30 is connected with a memory 32 which preferably includes a read-only memory as well as a random access memory.

Figure 10:
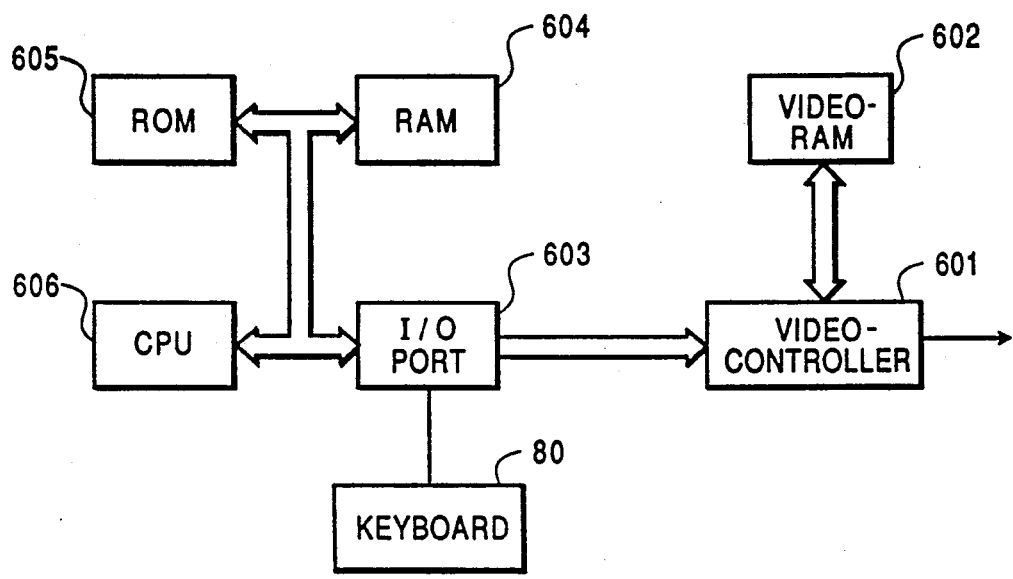
FIG. 10, a block circuit diagram of a video interface.

FIG. 10 shows an example of the internal structure of the video interface which includes an input/output module 603 connected with chess clock 45, electronic chessboard 1 as well as input keyboard 80. Input/output module 603 is connected, via an address and data bus, with a processor 606 and with a random access memory 604 and a read-only memory 605. The output of the input/output module is connected with a video controller 601. Preferably, eight output lines connect input-/output module 603 with video controller 601. Video controller 601 is connected via an internal video controller bus with a video RAM 602 in which ar stored image repeats as well as various symbols required for commenting on and monitoring the game and for indicating moves on the chessboard or the like. The output of video, controller 601 is connected with the video display device 90 or with a monitor.

The above illustrated and described electronic chessboard 1 is able to detect the position, as well as the identity of the individual chess pieces and to transmit the respective occupation of the individual chessboard squares in the form of electrical signals to video interface 60. Video interface 60 combines the electrical signal input into an image representing chessboard 1 depicting the respective positions of the chess pieces and transmits this composite image, in a known manner, as a video signal to the monitor or the video display device 90. In addition, the playing time and/or the thinking time spent by each one of the players, which is covered by means of chess clock 45, can be cut into the picture appearing on monitor 90 or can be indicated on monitor 90 as running time at the upper or lower edge of the picture.

In addition, it is possible to feed in a commentary on the respective chess game by way of input keyboard 80, and this commentary can likewise be displayed on monitor 90. Such commentary may, for example, consist of displaying the respective last move by marking the respective squares in color. It is also possible to mark the squares of a row, column or diagonal controlled by one chess piece with color or, in a black-and-white image, with a difference in brightness. Another possibility is to show alternative moves for the actually performed move or the future moves resulting as the consequence of a move.

The signals detected by video interface 60 with respect to the position and quality of the chess pieces on electronic chessboard 1 are fed, possibly together with an indication of the time and commentary, to sample-and-hold circuit 50.

Sample-and-hold circuit 50 stores the data put out by the individual video interfaces 60 together with the addresses of the respective video interfaces 60 and transfers the stored data of the individual video interfaces, when called up or cyclically or in accordance with a certain, given program, to data processing device 30. Data processing device 30 processes the game data as well as the tournament data and is additionally able to perform administrative tasks, such as tournament invitations, preparation of game reports and the like.

Moreover, it is possible for data processing device 30 to cause specifically called-up electronic chessboards 1 to be displaced on large-screen display 100 or on monitor 35. All games performed on the individual electronic chessboards 1 are printed out in printer 33 and, if required, stored in memory 32 together with an identification so that individual chess games can be referred to as desired. By way of a modem 34, individual or selected data can be fed to a long-distance network 101 from where the respective tournament and game data can be called up, displayed or fed into a television network at another location.

The immediate printout of the individual chess games in printer 33 permits the elimination of the preparation of individual game protocols by a secretary or by the chess players themselves so that the chess players are relieved of such administrative tasks. Additionally it is possible to indicate and print out the scores immediately after the last pending game or already earlier, depending on the importance of this last game, so that tournament results are available much earlier than is the case at present tournaments where all games must be manually evaluated by tournament staff.

Since a legality check, i.e. a check as to whether individual moves are permitted, is already made in video interface 60 or in electronic chessboard 1, the work of the referee can be simplified considerably as illegal moves are rejected already at that stage or at that level, respectively. The respective error can be documented and included in the game report and printed out. Likewise, exceeding the time allowed can be indicated immediately and can be considered by tournament staff. In the extreme case, it is possible to employ only one referee at a central location, i.e. at data processing device 30 this referee monitors all games and intervenes in individual games only in the case of differences.

Another advantageous use of the arrangement is in the performance of simultaneous games in which an individual player plays against a plurality of opponents. In the past, this was done in that the individual player successively moved to the individual chessboards to make his respective move. With the disclosed arrangement, it is possible for the individual player to successively display the individual o chess games on the monitor 35 connected to data processing device 30 and input his countermoves into data processing device 30 by way of the keyboard, with his countermoves being displayed, for example, in the form of blinking of light-emitting diodes arranged on the squares of the electronic chessboards. It is of course within the scope of the present invention that transmission lines lead not only from the individual electronic chessboards ? via video interfaces 60 to the sample-and-hold circuit and further to data processing device 30 but also in the reverse direction.

Figure 11:
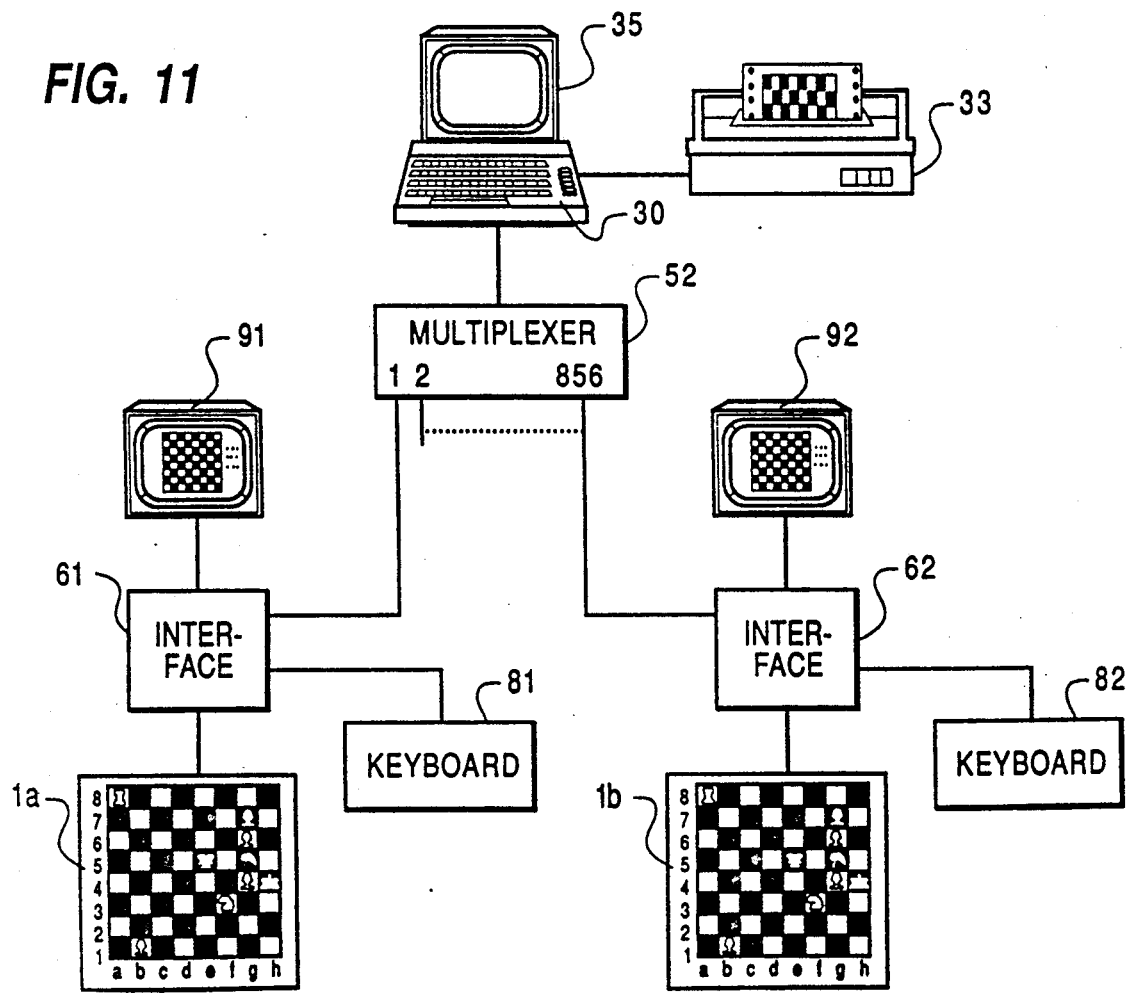
FIG. 11, a block circuit diagram of an arrangement according to FIG. 9 including a plurality of video interfaces connected to a sample-and-hold circuit.
Figure 12:
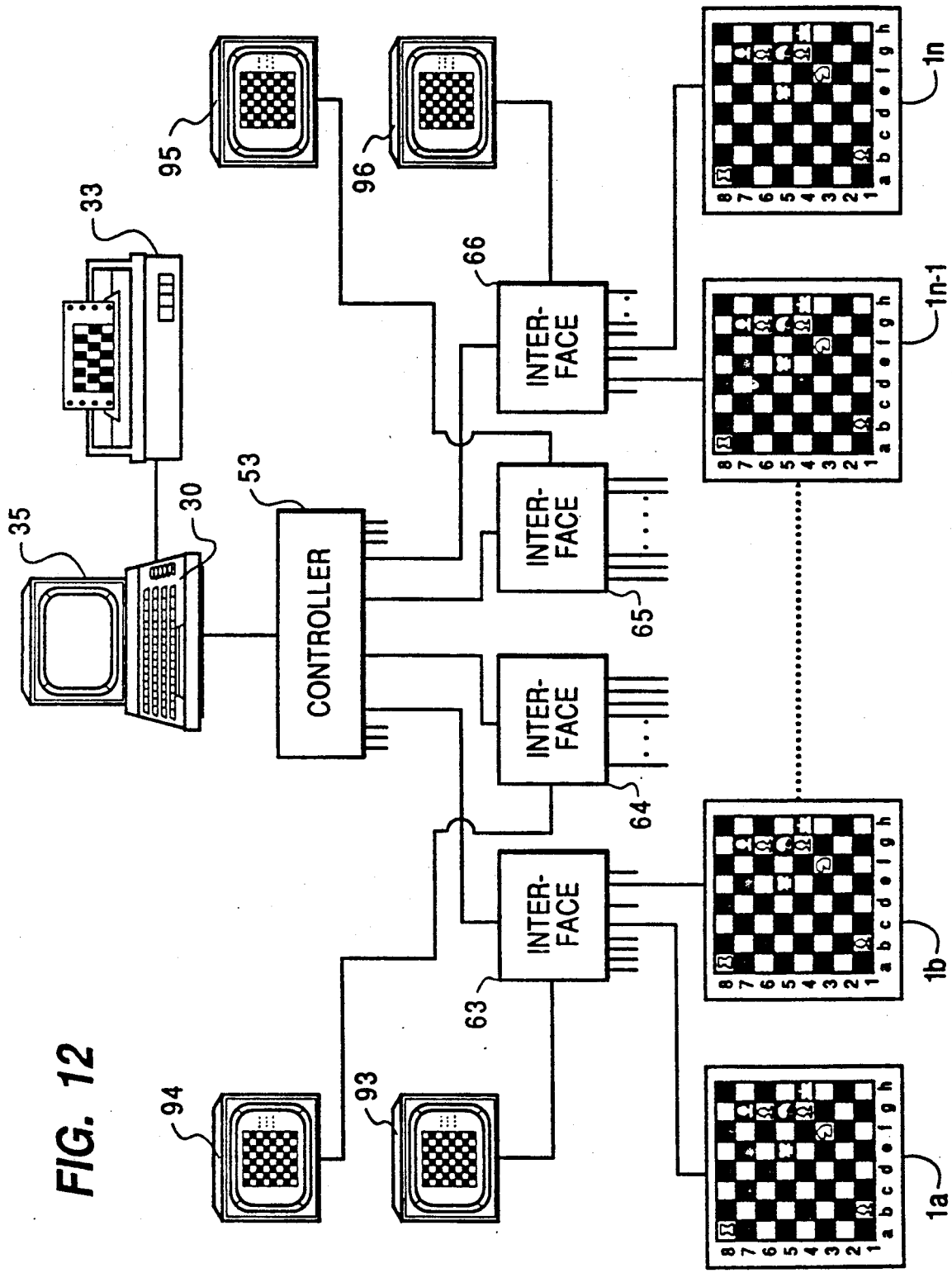
FIG. 12, a block circuit diagram of a plurality of video interfaces connected by way of a network controller to a data processing device.

Various possibilities for linking the individual electronic chessboards with the central data processing device are shown in FIGS. 11 and 12.

FIG. 11 shows the connection of up to 256 electronic chessboards 1a, 1b via video interfaces 61, 62 with a scanning device which, for example, can be a multiplexer 52 that processes the output signals of the individual video interfaces arriving on lines 1 to 256 as follows.

Multiplexer 52 interrogates the individual video interfaces 61, 62 connected to its inputs and transmits the interrogated signals to data processing device 30.

Here the data of the individual units are stored and printed by means of printer 33 or displayed on monitor 35 and evaluated in response to a corresponding selection.

Each one of video interfaces 61, 62 is connected with an input keyboard 81, 82 so that the individual games played on electronic chessboards 1a, 1b can be commented on. Additionally, each video interface 61, 62 is provided with its own monitor 91, 92 so that the games played on electronic chessboards 1a, 1b can be displayed individually on the associated monitor 91 or 92, respectively, together with the respective commentary put in via input keyboard 81, 82.

In the arrangement shown in FIG. 12, a plurality of electronic chessboards 1a, 1b to 1n-1, 1n are connected with the inputs of respective video interfaces 63, 64, 65, 66 so that a plurality of chessboards are associated with one video interface 63, 64, 65, 66. Analogously to the abovedescribed arrangement, video interface 63, 64, 65, 66 is connected with an input keyboard and with respective monitors 93, 94, 95, 96. In this way, it is possible, for example, for ten electronic chessboards to be combined into groups by way of video interfaces 63 to 66 so that one of the ten chess games can be commented on by way of the input keyboard and displayed on monitor 93. A network controller 53 is connected with the outputs of the various video interfaces 63 to 66. Network controller 53 scans the outputs of the various video interfaces 63 to 66, stores the values and transfers the stored values sequentially or under control of a program to data processing device 30.

In this way, for example, 30 inputs of network controller 53 are occupied so that, with 10 electronic chessboards connected to each video interface, a total of 300 electronic chessboards 1a to 1n can be covered.

In the manner described above, data processing device 30 processes the data put in through network controller 5 and prints the appropriate game protocols on a printer 33 and displays individual, selected chess games on monitor 35 or on a large-screen display 100. Additionally, it is possible, in the already described manner, to transmit all tournament data or selected games of a tournament via a modem and a long-distance transmission line to any desired location where the data are further processed for display or evaluation.

The arrangement shown in FIG. 12 is particularly suitable for larger tournaments since, for example, each video interface can be occupied by a referee or a commentator who monitors or comments on a manageable number of chess games. Since all data arriving at the video interfaces are forwarded to network controller 53, it is possible to assemble a complete protocol and reply individual games in data processing device 30. Additionally it is ensured that the game results are compiled immediately and are utilized to determine the tournament champion.

The automatic protocol of individual games additionally ensures that, particularly in the final phase of tournament plying when the total of two hours thinking time for each player is almost completely used up, the players are freed of superfluous writing tasks. By calling a game up from memory it is possible without difficulty to reply individual games and to display them on a monitor even after the tournament has ended. In this way, particularly interesting games can be relayed at any time and can be utilized for teaching and demonstration purposes.

I claim:

1. Apparatus for determining the identity and position of a plurality of individual game pieces disposed in different fields of a game board comprising:
    a playing area divided into a plurality of equal size fields, each of said fields being subdivided into at least a first subfield and a second subfield and having an insulating layer disposed between said first and second subfields;
    a plurality of identification devices, each respective identification device including an impedance arrangement and being disposed with a respective one of the plurality of individual game pieces, each said impedance arrangement electrically connecting said first and second subfields of a respective field when a game piece is placed upon the respective field;
    signal generating means, connected with said first subfields, for applying an electrical input signal to said first subfields, the electrical input signal being conducted to the second subfield of a respective field by one of said identification devices placed on the respective field to produce an electrical output signal in dependence of the impedance of the impedance arrangement of said one identification device;
    scanning means, connected with said second subfields, for scanning each of said second subfields and for determining if an electrical output signal is present at respective second subfields;
    an evaluation device connected to said scanning means and including: storage means for storing signals associated with the impedance arrangement of each of said individual game pieces; and comparator means for comparing the stored signals with the scanned electrical output signals, said comparator means providing an output signal indicating that an electrical output signal scanned at a specific second subfield corresponds to one of said stored signals; and
    output means for receiving the output signals of said comparator means and providing a signal corresponding to the identity and position of a game piece.

2. Apparatus according to claim 1, wherein the signal generating means sequentially feeds a direct voltage signal to the first subfields.

3. Apparatus according to claim 2, wherein the evaluation device is connected with the signal generating means and feeds coded signals (A0, A1, A2) for the sequential excitation of the first subfields to the signal generating means which sequentially applies a direct voltage signal to the first subfields; and the scanning means comprises a multiplexer which successively calls up the electrical output signals present at the second subfields and feeds them to the evaluation device.

4. Apparatus according to claim 1, wherein the impedance arrangement is composed of three resistors arranged in an equilateral triangle whose corner points form contact points, the contact points providing the electrical connection between the impedance arrangement and the subfields and wherein the signal generating means sequentially feeds a direct voltage.

5. Apparatus according to claim 4, wherein the playing area is divided into 64 square fields defining a chessboard, each field having a side length (D), said first and second subfields being of equal size; the individual game pieces define chess pieces and the contact points of each impedance arrangement are disposed at the underside of the chess pieces and meet the equation $$H > \frac{D}{2}$$

where H is the height of the equilateral triangle.

6. Apparatus according to claim 4, wherein the playing area is divided into 64 square fields defining a chessboard, each field having a side length (D), a third subfield and insulating layers disposed between each subfield; said first second and third subfields are of equal size; and the individual game pieces are chess pieces and the contact points of each impedance arrangement are disposed at the underside of the chess pieces meet the equation $$H > \frac{D}{3}$$

where H is the height of the equilateral triangle.

7. Apparatus according to claim 4, wherein the diameter of the contact points is slightly less than the thickness of the insulating layers.

8. Apparatus according to claim 1, wherein the playing area is a chessboard having 64 square fields arranged in eight rows and columns; the evaluation device includes three first address outputs and three second address outputs and is connected to the signal generating means; the signal generating means is an 8-bit latch having three address inputs connected with three first address outputs (A0 to A2) of the evaluation device and eight outputs connected with the eight columns of the chessboard; and the scanning means comprises an 8-bit multiplexer having eight inputs connected with the eight rows (1) to (8) of the chessboard and three address inputs connected with the three second address outputs (A3 to A5) of the evaluation device.

9. Apparatus according to claim 8, further comprising an analog/digital convertor and wherein the plurality of game pieces are chess pieces and the evaluation device comprises a processor; the output of the multiplexer is connected, via the analog/digital converter which converts a direct current value detected in a field occupied by a chess piece into a digital signal, to the processor which compares the digital signal outputted by the analog/digital converter with the stored values for the respective chess piece and, if there is coincidence, outputs a signal ($X_1$, $X_2$) which identifies the identity and position of the respective chess pieces.

10. Apparatus according to claim 1, further comprising a voltage/frequency converter and wherein the plurality of game pieces are chess pieces, the stored signals are frequency values, the scanning means comprises a multiplexer and the evaluation device comprises a processor; wherein the output of the multiplexer is connected, via the voltage/frequency converter which converts a direct current value received from a field occupied by a chess piece into a signal at a certain frequency, to the processor which compares the frequency signal outputted by the voltage/frequency converter with the stored frequency values for the respective chess piece and, if there is coincidence, outputs a signal ($X_1$, $X_2$) which identifies the identity and position of the respective chess piece.

11. Apparatus according to claim 1, wherein the playing area is an electrically insulated plate, and the subfields are conductive foils fastened to the electrically insulated plate, with the conductive foils corresponding to the configuration of the subfields.

12. Apparatus according to claim 1 for use as a chess game wherein the playing area is a chessboard having a matrix of square fields arranged in eight rows and eight columns, the first subfields of each column are interconnected with one another, and the second subfields of each row are connected with one another and with the scanning means which is configured as a multiplexer.

13. Apparatus according to claim 1, wherein said electrical input signal is a direct voltage signal and the identification device is a resistance arrangement; and said signal generating means comprises a clock pulse generator and sequentially applies the direct voltage to said first subfields under the control of the clock pulse generator, and said scanning means includes a multiplexer for scanning said second subfields in a multiplex process simultaneously with the respectively applied direct voltage signal to said first subfields and, if a field is occupied by a chess piece, the current flowing through the respective resistance arrangement of the occupying chess piece is measured and compared with said stored values of each of said chess pieces.

14. Apparatus according to claim 13, wherein the evaluation device comprises an analog/digital converter connected to the output of the comparator means, and a processor; said analog/digital converter converts measured analog signals into digital signals and then feeds the digital signals to the processor, the processor compares the digital measurement signals with stored digital signals associated with the individual chess pieces and, if there is coincidence, emits a signal corresponding to the position and identity of the respective chess pieces.

15. System for monitoring, displaying, commenting and documenting chess games comprising:

at least one electronic chessboard, each chessboard including:

a plurality of individual chess pieces;

a playing area divided into a plurality of equal size fields, each of said fields being subdivided into at least a first subfield and a second subfield and having an insulating layer disposed between said first and second subfields;

a plurality of identification devices, each respective identification device including an impedance arrangement and being disposed with a respective one of the plurality of individual chess pieces, each said impedance arrangement electrically connecting said first and second subfields of a respective field when a chess piece is placed upon the respective field;

signal generating means, connected with said first subfields, for applying an electrical input signal to said first subfields, the electrical input signal being conducted to the second subfield of a respective field by one of said identification devices placed on the respective field to produce an electrical output signal in dependence of the impedance of the impedance arrangement of said one identification device;

scanning means, connected with said second subfields, for scanning each of said second subfields and for determining if an electrical output signal is present at respective second subfields;

an evaluation device connected to said scanning means and including: storage means for storing signals associated with the impedance arrangement of each of said individual chess pieces; and comparator means for comparing the stored signals with the scanned electrical output signals, said comparator means providing an output signal indicating that an electrical output signal scanned at a specific second subfield corresponds to one of said stored signals; and output means for receiving the output signals of said comparator means and providing a signal corresponding to the identity and position of a chess piece;

a video interface connected to the at least one electronic chessboard for receiving a signal representing the position of chess pieces placed thereon;

a video display device connected to the output of the video interface;

a sample-and-hold circuit connected to the output of the video interface;

an input keyboard;

a chess clock operable by the players and connected to the video interface, and a data processing device, wherein the video interface is connected with the input keyboard for receiving inputs of game data which are at least one of (a) displayed on the video display device and (b) fed to the data processing device, and the sample-and-hold circuit is connected with the input of the data processing device.

16. System according to claim 15, further comprising a plurality of video interfaces, each connected with a separate electronic chessboard and connected to separate inputs of the sample-and-hold circuit.

17. System according to claim 15, and further comprising a second video display device, wherein the output of the data processing device is connected with the second video display device.

18. System according to claim 15, wherein the sample-and-hold circuit comprises a network controller whose inputs are connected with the outputs of a plurality of video interfaces whose data are stored in the network controller and are fed to the data processing device cyclically or under the control of a program.

19. System according to claim 15 and further comprising a modem connectable with a long distance transmission network, wherein the data processing device is connected to the modem.

20. System according to claim 15, wherein the video interface includes a video controller, an input/output module and a video RAM, and the video controller is connected to the input/output module and the video RAM in such a manner that, by appropriate actuation of the input keyboard, individual or groups of chessboard squares are emphasized by differences in color or brightness.

21. System according to claim 20, wherein the video interface further includes a processor which is connected, via an address and data bus, a read-only memory and a random-access memory, and the processor is connected, via an address and data bus, to the read-only memory, the random-access memory and the input/output module; the output of the video controller is connected with the video display device and the input/output module is connected with the input of the network controller.

22. Apparatus for determining the identity and position of a plurality of individual game pieces disposed in different fields of a game board comprising:

a playing area divided into a plurality of equal size fields, each of said fields being subdivided into first, second and third subfields and having an insulating layer disposed between each subfield;

an identification device including an impedance arrangement disposed with each of said game pieces, said impedance arrangement electrically connecting at least two of said first, second and third subfields of a respective field when a game piece is placed upon the respective field;

signal generating means, connected with one of said first, second and third subfields of each field, for applying an electrical input signal to said one subfields, the electrical signal being conducted to the other subfields of a respective field by one of said identification devices placed on the respective field to produce an electrical output signal in dependence of the impedance of the impedance arrangement of said one identification device;

scanning means being connected with the other subfields for scanning each of the other subfields and for determining if an electrical output signal is present at respective other subfields;

an evaluation device connected to said scanning means and including: storage means for storing signals associated with the impedance arrangement of each of said individual game piece; and comparator means for comparing the stored signals with the scanned electrical output signals, said comparator means providing an output signal indicating that an electrical output signal scanned at a specific other subfield corresponds to one of said stored signals; and output means for receiving the output signals of said comparator means and providing a signal corresponding to the identity and position of a game piece.

23. Apparatus according to claim 22, wherein said signal generating means sequentially applies electrical input signals to said one subfields and said scanning means sequentially scans said other subfields.

24. Apparatus according to claim 22, wherein said scanning means includes a multiplexer for scanning the electrical output signals in a multiplex process.

* * * * *